April 30, 1968     C. L. NEWTON     3,380,809
PROCESS FOR LIQUEFACTION AND CONVERSION OF HYDROGEN
Filed Oct. 16, 1963     4 Sheets-Sheet 1

FIG.1A

INVENTOR
CHARLES L. NEWTON
BY
SHANLEY & O'NEIL
ATTORNEYS

April 30, 1968         C. L. NEWTON         3,380,809

PROCESS FOR LIQUEFACTION AND CONVERSION OF HYDROGEN

Filed Oct. 16, 1963         4 Sheets-Sheet 2

FIG.1B

INVENTOR
CHARLES L. NEWTON
BY
SHANLEY & O'NEIL
ATTORNEYS

April 30, 1968   C. L. NEWTON   3,380,809
PROCESS FOR LIQUEFACTION AND CONVERSION OF HYDROGEN
Filed Oct. 16, 1963   4 Sheets-Sheet 4

FIG.1D

INVENTOR
CHARLES L. NEWTON
BY
SHANLEY & O'NEIL
ATTORNEYS

United States Patent Office 3,380,809
Patented Apr. 30, 1968

3,380,809
PROCESS FOR LIQUEFACTION AND
CONVERSION OF HYDROGEN
Charles L. Newton, Emmaus, Pa., assignor to Air Products
and Chemicals, Inc., a corporation of Delaware
Filed Oct. 16, 1963, Ser. No. 316,728
16 Claims. (Cl. 23—210)

ABSTRACT OF THE DISCLOSURE

Process for producing liquid hydrogen of high para composition in which compressed hydrogen gas of normal equilibrium composition (75% ortho-hydrogen—25% para-hydrogen) is cooled by heat interchange with relatively cold fluid and passed at progressively decreasing temperature levels in contact with a catalyst which accelerates conversion of ortho-hydrogen to para-hydrogen and in which the cooled compressed hydrogen gas is expanded to a lower pressure and cooled to a temperature within the liquefaction region to provide liquid hydrogen of high para composition.

---

This invention relates to the liquefaction of hydrogen and more particularly to a method of and apparatus for producing liquid hydrogen of high para composition.

It is known that normal hydrogen is a mixture of two gases referred to as ortho-hydrogen and para-hydrogen, and that the equilibrium concentration of ortho-hydrogen and para-hydrogen varies with temperature. At temperatures above −100° F. normal hydrogen exists, that is, hydrogen having an equilibrium composition of 75% ortho-hydrogen and 25% para-hydrogen while, at lower temperatures, the equilibrium composition is such that concentrations of para-hydrogen increase with decrease in temperature, the para-hydrogen concentration gradually increasing from about 25% to about 38% as the temperature decreases from about −100° F. to about −280° F. and then rapidly increases to about 100% para-hydrogen as the temperature further decreases to the boiling point of hydrogen at atmospheric pressure. Thus, liquefied normal hydrogen under atmospheric pressure undergoes autogenous conversion of ortho-hydrogen to para-hydrogen until an equilibrium composition of about 100% para-hydrogen is established.

It is also known that ortho-hydrogen conversion is an exothermic reaction releasing about 457 B.t.u./lb. mol upon conversion of normal hydrogen to 100% para-hydrogen and that autogenous conversion of ortho-hydrogen to para-hydrogen is not instantaneous but requires an appreciable time interval for its completion. Since the ortho-hydrogen conversion reaction is exothermic, liquid hydrogen will continuously evaporate until 100% para-hydrogen composition is reached. The percentage of mass of liquid hydrogen that is lost by vaporization is a function of the ortho-hydrogen composition of the liquid hydrogen at the time ortho-hydrogen conversion begins, such as the time liquid hydrogen is introduced into a storage vessel, and a function of the degree of completeness of conversion of ortho-hydrogen to para-hydrogen, that is, the storage period. It has been determined that when liquid normal hydrogen is stored in an insulated vessel under atmospheric pressure after about eight days of autogenous conversion of ortho-hydrogen to para-hydrogen the loss of liquid is such that only about 50% of the initially stored liquid hydrogen remains. Thus, it is not practical to store liquefied normal hydrogen.

It has been proposed in the past to accelerate conversion of ortho-hydrogen to para-hydrogen by the use of a catalyst placed in the liquefier at different temperature levels including the liquid receiving zone in contact with liquid hydrogen under superatmospheric or atmospheric pressure. With such arrangements, it is possible to produce liquid hydrogen of high para composition which may be stored at atmospheric pressure without appreciable liquid loss. However, since th ecatalytic conversion of ortho-hydrogen is an exothermic reaction, there is no reduction in the loss of liquid or liquid making capacity of the liquefiers.

It is therefore an object of the present invention to provide a novel method of and apparatus for producing liquid hydrogen of high para composition.

Another object is to provide a novel method of and apparatus for producing liquid hydrogen of a high para composition in which the power required per mol of product is materially less than the power requirements of prior cycles.

Still another object of the present invention is to provide a novel liquefaction cycle in which losses due to irreversibility of the process are materially reduced.

A further object of the present invention is to provide a novel process for the liquefaction and conversion of hydrogen including a liquefier having the foregoing characteristics which provides a portion of the refrigeration requirements.

The foregoing and other objects and features of the present invention will appear more fully from the following detailed description considered in connection with the accompanying drawings which disclose a preferred embodiment of the invention. It is to be expressly understood, however, that the drawings are designed for purposes of illustration only and not as a definition of the limits of the invention, reference for the latter purpose being had to the appended claims.

Figure 1A:
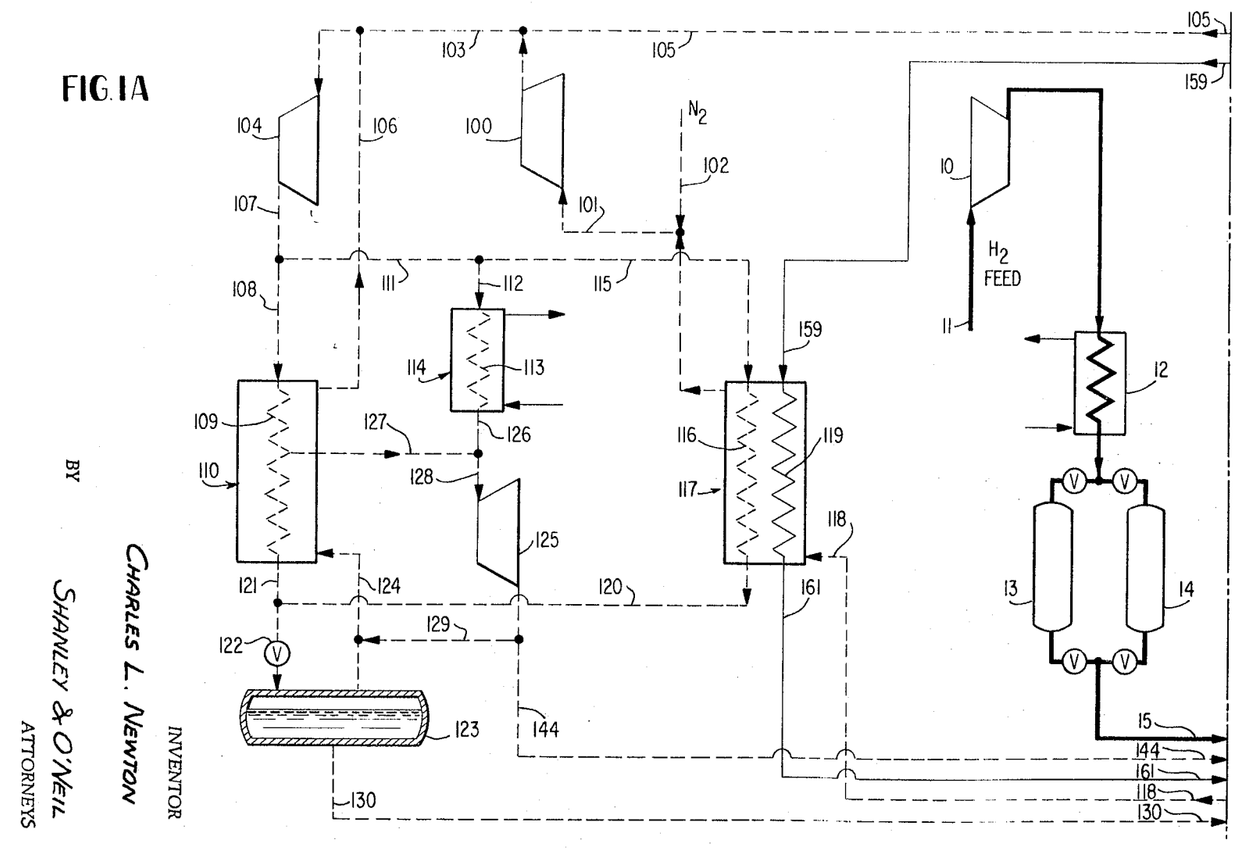
FIGURES 1A, 1B, 1C, and 1D of the drawings diagrammatically illustrate a hydrogen liquefaction and conversion cycle constructed in accordance with the principles of the present invention.
Figure 1B:
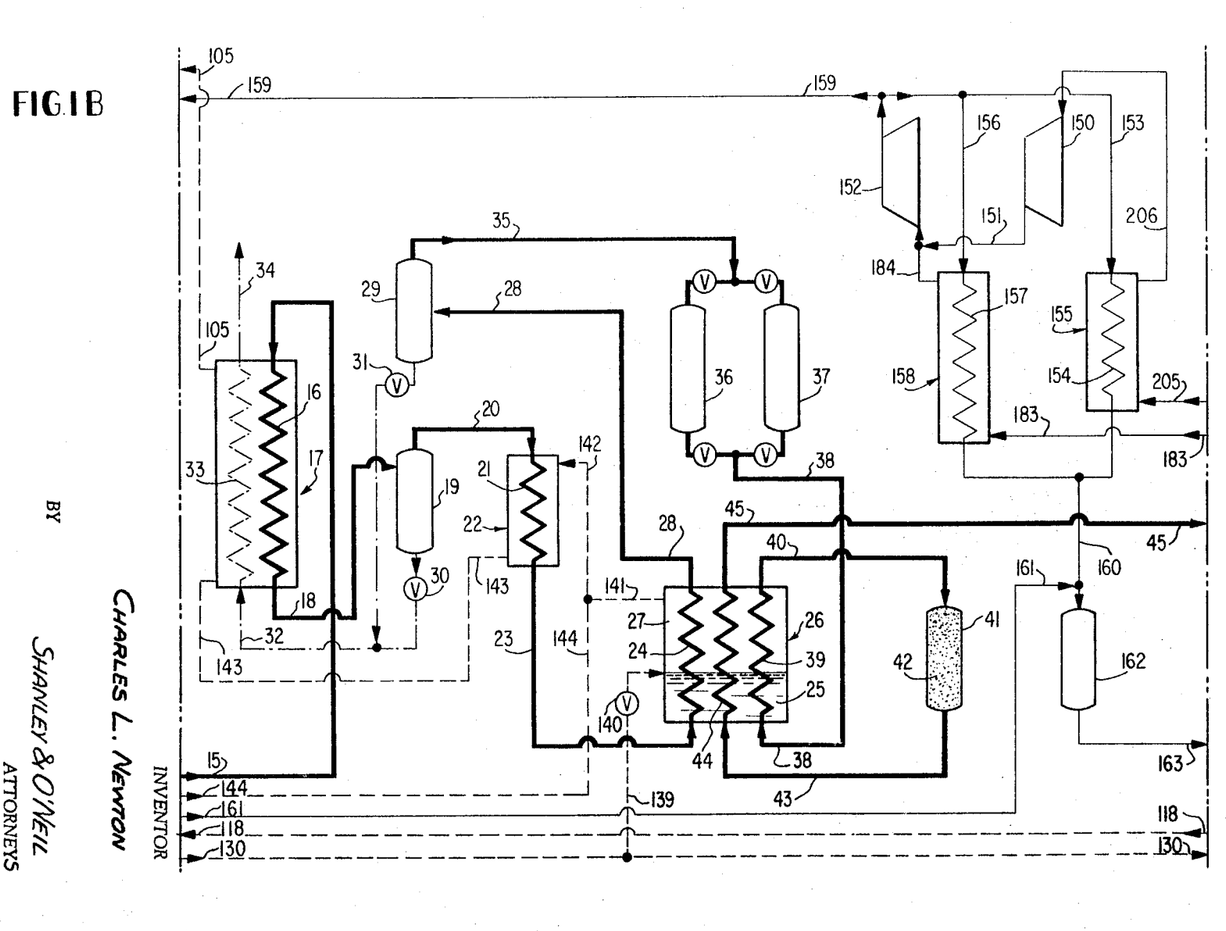

With reference to FIGURE 1A of the drawings, the cycle includes a hydrogen feed compressor 10 fed with normal hydrogen gas through conduit 11. The hydrogen feed gas is discharged from the compressor under any desired pressure such as 600 p.s.i.a., for example, and is cooled to about 40° F. upon flow through heat exchange device 12 in heat interchange with a suitable external refrigerant prior to entering a dryer for removing traces of moisture. The dryer may be of the adsorbent type including vessels 13 and 14 connected in parallel through switching valves to permit reactivation of one vessel while the other is onstream, the reactivation system not being shown. The hydrogen feed gas leaves the dryer 13 or 14 at about 40° F. through conduit 15 and, as shown in FIGURE 1B, flows through passageway 16 of heat exchange device 17 in countercurrent heat interchange with relatively cold fluids described above and leaves the cold end of the heat exchange device by way of conduit 18 at about −240° F. and is conducted thereby to a phase separator 19 wherein liquefied high boiling point impurity such as hydrocarbons are separated from the hydrogen feed gas. A conduit 20 conducts the hydrogen feed gas from the separator 19 for flow through passageway 21 of heat exchange device 22 in countercurrent heat interchange with relatively cold nitrogen gas described below to cool the hydrogen feed gas to about −250° F., and then conduit 23 passes the cooled gas for flow through coil 24 partly immersed in a pool 25 of liquid nitrogen retained in a vessel 26 under superatmospheric pressure. The coil 24 extends through the vapor space 27 of the vessel 26 and the hydrogen feed gas is cooled to about −292° F. upon flowing through the coil 24 and then conducted by conduit 28 to a phase separator 29 where lower boiling point impurities such as methane, for example, are separated from the hydrogen feed gas. Liquid withdrawn from the phase separators 19 and 29 is expanded in valves 30 and 31, respectively, to about atmospheric pressure and merged in conduit 32 for flow through passageway 33 of heat exchange device 17 in countercurrent heat interchange with the hydrogen feed gas, such heat interchange effecting vaporization of the liquid which leaves the passageway 33 at the warm end of the heat exchange device through conduit 34 at about ambient temperature.

Hydrogen feed gas at a temperature of about −292° F. leaves the phase separator 29 through conduit 35 for flow through one or the other of a pair of purifiers 36 and 37 to remove traces of oxygen and nitrogen or other impurities. The purifiers 36 and 37 may be of the absorbent type and are connected in parallel through switching valves to permit one to be on stream while the other is being purged. The purified hydrogen feed gas leaves the adsorbers 36 or 37 at about −278° F. and is then flowed by way of conduit 38 through passageway 39 partly immersed in the pool 25 of liquid nitrogen. From the pasageway 39, the hydrogen feed gas at a temperature of about −292° F. is conducted by conduit 40 for flow through ortho-hydrogen converting device 41 which comprises a vessel filled with a suitable catalyst 42 such as a mass of particles of any one of a number of known materials capable of accelerating conversion of ortho-hydrogen to para-hydrogen such as ferric hydroxide, for example. The hydrogen feed gas flowing from the converting device 41 has a composition of about 35% para-hydrogen and is warmed to about −280° F. due to the heat of the conversion. The 35% para-hydrogen feed is conducted by conduit 43 for flow through passageway 44 located within the vessel 26 in heat interchange with the liquid nitrogen 25 and the vapor space 27; the 35% para-hydrogen feed gas leaves the passageway 44 through conduit 45 at about −292° F. for flow through a series of passageways of a heat exchange zone in heat interchange with relatively cold fluid and alternately through ortho-hydrogen converting devices to provide further cooled hydrogen feed gas of high para composition.

As shown on FIGURE 1C of the drawings, the conduit 45 conducts 35% para-hydrogen feed gas for flow through passageway 46 of a heat exchange device 47 for countercurrent heat interchange with relatively cold hydrogen vapor flowing through the shell side of the heat exchange device as described below. The 35% para-hydrogen feed gas is withdrawn from the passageway 46 at a temperature of about −340° F. and passed by conduit 48 for flow through a second converting device 49 wherein the para composition of the hydrogen feed gas is increased to about 50% with a rise in temperature due to the heat of conversion to about −330° F. The 50% para-hydrogen feed gas is conducted by conduit 50 for flow through passageway 51 of the heat exchange device 47 from which the 50% para-hydrogen feed gas is withdrawn at about −355° F. and passed by conduit 52 for flow through a third converting device 53; the hydrogen feed gas leaves the converting device 53 at a temperature of about −345° F. and a para composition of about 60%. The 60% para-hydrogen feed gas is then conducted by conduit 54 for flow through passageway 55 of the heat exchange device 47 to remove the heat resulting from the last converting operation, and at a temperature of about −364° F. is passed by conduit 56 for flow through passageway 57 of heat exchange device 58 where the 60% para-hydrogen feed gas is further cooled to about −370° F. before flow through a fourth converting device 59, by way of conduit 60. The heat exchange device 58 also includes a hydrogen feed gas passageway 61 having its warm end connected by conduit 62 to the outlet of the converting device 59 and its low temperature end connected by conduit 63 to a fifth converting device 64, a hydrogen feed gas passageway 65 having its warm temperature end connected by conduit 66 to the output side of the converting device 64 and its low temperature end connected by conduit 67 to a sixth converting device 68, and a hydrogen feed gas passageway 69 having its warm temperature end connected by conduit 70 to the output of the converting device 68 and its other end being connected to conduit 71 at the cold end of the heat exchange device 58. The hydrogen feed gas flows serially through the passageways 57, 61, 65 and 69 in countercurrent heat interchange with relatively cold hydrogen vapor flowing through the shell side of the heat exchange device 58, as described below, and alternately through the converting devices 59, 64 and 68, to effect further cooling and further ortho-hydrogen conversion of the hydrogen feed gas. It is of course understood that the converting devices 59, 64 and 68, as well as the converting devices 49 and 53, contain any suitable catalyst to effect conversion of ortho-hydrogen to para-hydrogen. In particular, the hydrogen feed gas leaves the converting device 59 at about 70% para composition and a temperature of about −365° F. and the 70% para-hydrogen feed gas is cooled in the passageway 61 to about −380° F. In the converting device 64, the para composition is increased to about 80% with a temperature rise to about −375° F. and the 80% para-hydrogen feed is cooled to about −402° F. upon flowing through the passageway 65 before entering the converting device 68. In the latter converting device, the para-hydrogen composition is increased to about 90% and warmed to a temperature of about −395° F. and the 90% para-hydrogen feed is cooled in the passageway 69 to about −402° F.

Figure 1C:
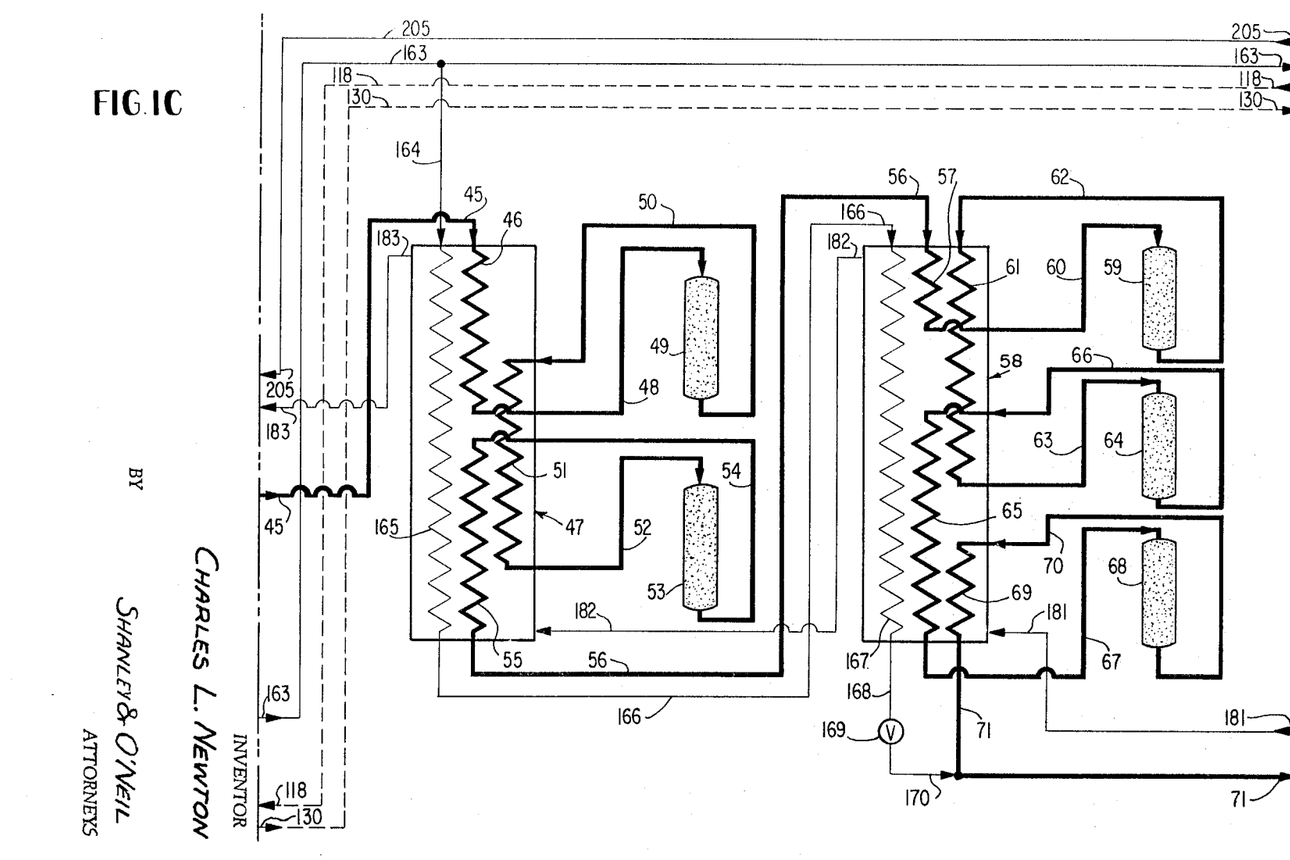
Figure 1D:
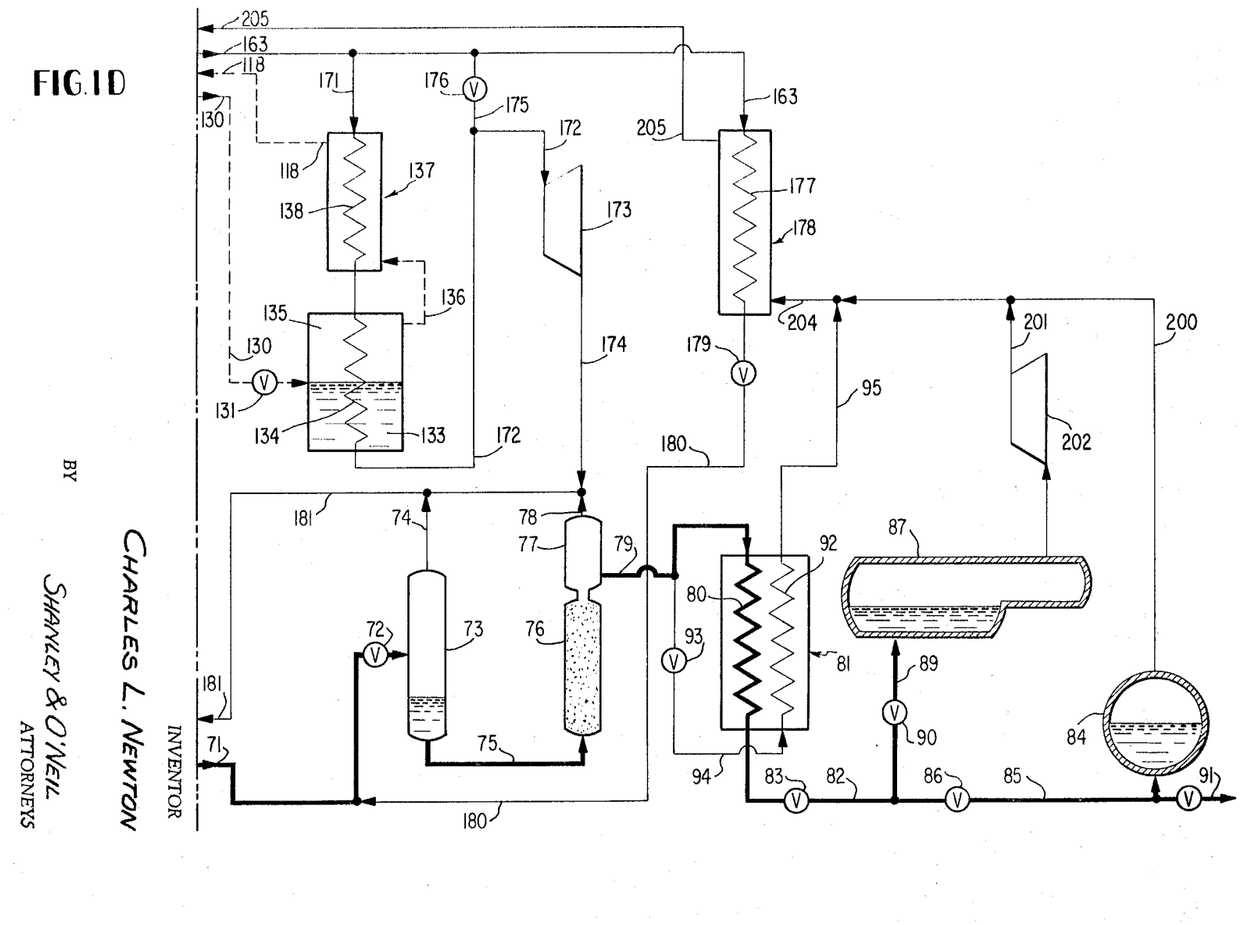

The 90% para-hydrogen feed gas is conducted by the conduit 71 to an expansion valve 72, shown in FIGURE 1D, whereat the pressure is reduced to a substantially lower superatmospheric pressure within the liquefaction range such as, for example, 50 p.s.i.a. and thereby cooled to about −414° F. The expanded hydrogen is fed to a phase separator 73 from which 90% para-hydrogen vapor is withdrawn through conduit 74 and 90% para liquid hydrogen withdrawn through conduit 75 for flow through a converting device 76 wherein the para-hydrogen composition is increased to about 95%. The converting device 76 communicates with a phase separator 77 from which 95% para-hydrogen vapor resulting from the heat of conversion is withdrawn through conduit 78 and 95% para-hydrogen liquid is withdrawn through conduit 79. The 90% para-hydrogen liquid is passed by the conduit 79 through passageway 80 of heat exchange device 81 wherein the liquid hydrogen is subcooled to about −420° F. and then passed to delivery conduit 82 having a pressure reducing valve 83 by which the pressure of the 95% para-hydrogen liquid may be further reduced as desired. Converted liquid hydrogen may be transferred to a storage vessel 84 by way of conduit 85 having a control valve 86 or to a mobile storage vessel, such as a liquid hydrogen trailer 87, through conduit 89 provided with a control valve 90. Converted liquid hydrogen may be withdrawn from the storage vessel 84 through valve conduit 91. The 95% para-hydrogen liquid is subcooled upon flowing through the passageway 80 of the heat exchange device 81 in countercurrent heat interchange with relatively cold fluid flowing through passageway 92. The relatively cold fluid is obtained by flowing a portion of the 95% para-hydrogen liquid from the conduit 79 through a pressure reduction valve 93, by which the pressure of the liquid may be reduced close to atmospheric pressure, for example, and then fed by conduit 94 for flow through the passageway 92; the low pressure 95% para-hydrogen leaves the passageway 92 in vapor phase at about −422° F. through conduit 95.

Refrigeration required for the process is provided by a novel closed nitrogen refrigeration cycle and a hydrogen refrigeration cycle which incorporates a novel system of recycling of unliquefied hydrogen and hydrogen vapor of high para composition. As shown in FIGURE 1A, the nitrogen refrigeration cycle includes a first stage compressor 100 having an inlet connected to conduit 101 returning warm nitrogen gas under low pressure from the cycle as described below and to which make-up nitrogen may be added by way of conduit 102. The compressor 100 delivers nitrogen gas at any suitable intermediate pressure such as 65 p.s.i.a., for example, which is delivered by conduit 103 to the inlet of a final stage compressor 104 which delivers nitrogen gas under relatively high pressure such as 3000 p.s.i.a., for example. Of course, intermediate stages of compression may be employed together with inter and after coolers. The input to the final stage compressor is also fed through conduits 105 and 106 with nitrogen gas under the intermediate pressure returning from the cycle as described below. The discharge from the compressor 104 in conduit 107 is divided into three parts; a first part being conducted by conduit 108 for flow through passageway 109 of heat exchange device 110, a second part being conducted by conduits 111 and 112 for flow through passageway 113 of heat exchange device 114, and a third part being conducted by conduits 111 and 115 for flow through passageway 116 of heat exchange device 117. The high pressure nitrogen gas flowing through the passageway 116 of the heat exchange device 117 is cooled to about −272° F. in countercurrent heat interchange with relatively cold low pressure returning nitrogen gas at about −296° F. which enters the shell side of the heat exchanger through conduit 118 and leaves the warm end of the exchanger at substantially ambient temperature through the conduit 101 connected to the suction side of the compressor 100 as described above. The cold low pressure nitrogen gas flowing through the shell side of the heat exchange device 117 also effects cooling of high pressure hydrogen gas flowing through passageway 119 of the heat exchange device as will be described below in connection with the hydrogen recycle system. The cold compressed nitrogen gas from the heat exchange device 117 is conducted by conduit 120 and merged with compressed nitrogen gas cooled to about the same temperature leaving passageway 109 of the heat exchange device 110 through conduit 121. The combined streams are expanded in a valve 122 to a substantially lower superatmospheric pressure such as 65 p.s.i.a., for example, to effect substantial liquefaction of the gaseous material which collects in storage vessel 123 at a temperature of about −294° F. Unliquefied compressed gas is withdrawn from the vessel 123 through conduit 124 for flow through the shell side of the heat exchange device 110 in countercurrent heat interchange with the high pressure gaseous nitrogen and then conducted at substantially ambient temperature by conduit 106 to the inlet of the compressor 104. An expansion engine 125 provides refrigeration for the cycle. The high pressure nitrogen gas flowing from the heat exchange device 114 in conduit 126 and high pressure nitrogen gas withdrawn from the passageway 109 of the heat exchange device 110 through conduit 127 are merged and fed by conduit 128 to the inlet of the expansion engine 125 which operates at a discharge pressure corresponding to the intermediate pressure, namely, 65 p.s.i.a. The compressed nitrogen fed to the expansion engine is at about −32° F. so that the effluent of the expansion engine is above saturation temperature, for example at about −285° F. For this purpose, the compressed nitrogen in the conduit 127 is withdrawn from the heat exchange device 110 at about −32° F. and a relatively cold fluid from an external source is flowed through the shell side of the heat exchange device 14 to cool the compressed nitrogen flowing to the conduit 126 to about the same temperature. Effluent from the expansion engine is passed by conduit 129 for flow through the shell side of the heat exchange device 110 onto the inlet of compressor 104 through conduit 106.

The nitrogen refrigeration cycle described above provides refrigeration at a number of different points or zones of the hydrogen liquefaction and conversion system.

Liquid nitrogen is withdrawn from the vessel 123 through conduit 130 and passed through a valve 131, see FIGURE 1D, where its pressure is reduced to approximately atmospheric pressure and introduced into a vessel 132 where it collects in a pool 133. The vessel 132 includes a passageway 134 immersed in the pool 133 of liquid nitrogen and traversing the vapor space 135 of the vessel through which flows relatively warm fluid of the hydrogen refrigeration cycle, described below, effecting evaporation of the liquid nitrogen. The nitrogen vapor including vapor flashed upon the liquid flowing through the valve 131 is withdrawn from the vapor space of the vessel 132 at a temperature of about −316° F. and passed by conduit 136 through the shell side of heat exchange device 137 for cooling the relatively warm fluid flowing through the passageway 138 and leaves the heat exchange device 137 through the conduit 118 at about −296° F.; the conduit 118, as mentioned above, conducts the cold low pressure nitrogen gas for flow through the shell side of the heat exchange device 117 and on to the inlet of compressor 100 through conduit 101. As shown in FIGURE 1B, liquid nitrogen from the vessel 123 is withdrawn from the conduit 130 through branch conduit 139, provided with a liquid level control valve 140, and fed to the vessel 26 to provide the pool of liquid nitrogen 25 mentioned above. Liquid nitrogen in the pool 25 is vaporized upon the flow of hydrogen feed gas through the passageways 24, 39 and 44 and nitrogen vapor under a pressure of about 65 p.s.i.a. and at a temperature of about −293° F. is withdrawn from the vapor space 27 through conduit 141 and passed by conduit 142 for flow through the shell side of heat exchange device 22 to effect cooling of the hydrogen feed stream flowing through the passageway 21 as described above. The nitrogen vapor leaves the heat exchange device 22 through conduit 143 at about −272° F. for flow through the shell side of the heat exchange device 17 in countercurrent heat exchange with the hydrogen feed gas flowing through the passageway 16. The nitrogen vapor leaves the warm end of the heat exchange device 17 through conduit 105 which returns the intermediate pressure nitrogen gas at substantially ambient temperature to the suction side of the compressor 104. Effluent from the expansion engine 125, at the intermediate pressure of about 65 p.s.i.a. as described above, is conducted by conduit 144 for flow through the shell sides of the heat exchange devices 22 and 17 along with the nitrogen vapor withdrawn from the vessel 26 to provide refrigeration in cooling the hydrogen feed gas. As shown on FIGURE 1B, the conduit 144 is connected to the conduit 142. The nitrogen refrigeration cycle thus provides refrigeration to the system at four temperature levels; evaporating liquid nitrogen under superatmospheric pressure in vessel 26 and the resulting cold vapor and the effluent of the expansion engine provide refrigeration for cooling the hydrogen feed gas while the evaporating liquid nitrogen under substantially atmospheric pressure in the vessel 132 and the resulting cold vapor provide refrigeration and recycle arrangement.

With reference to FIGURE 1B, the hydrogen refrigeration and recycle arrangement includes a first stage compressor 150 which delivers hydrogen gas at an intermediate pressure of about 50 p.s.i.a. through conduit 151 to the suction side of a high stage compressor 152 which delivers hydrogen gas under relatively high pressure such as about 1500 p.s.i.a. Inter and after coolers may be provided as well as intermediate compressor stages. The high pressure hydrogen gas is divided into three parts; a first part being passed by conduit 153 for flow through passageway 154 of heat exchange device 155, a second part being conducted by conduit 156 for flow through passageway 157 of heat exchange device 158, and a third part being conducted by conduit 159 for flow through the passageway 119 of the heat exchange device 117 as mentioned above and as shown on FIGURE 1A. The high pressure hydrogen gas flowing through the heat exchangers 155 and 158 is cooled to about −290° F. and merged in conduit 160 while the third part of high pressure hydrogen gas leaves the heat exchange device 117 through conduit 161 at about the same temperature. The latter conduit is connected to the conduit 160 and the total high pressure hydrogen gas then flows through an adsorber 162 which functions to remove impurities such as traces of oxygen, for example, and the high pressure hydrogen gas flows from the adsorber through conduit 163 at a temperature of about −290° F.

As shown on FIGURE 1C, a part of the high pressure hydrogen gas is diverted from the conduit 163 through a conduit 164 for flow through passageway 165 of the heat exchange device 47 in countercurrent heat interchange with relatively cold fluid flowing through the shell side of the heat exchange device as described below to cool the high pressure hydrogen gas to a temperature of about −364° F. A conduit 166 conducts the thus cooled high pressure hydrogen gas for flow through passageway 167 of the heat exchange device 58 for further cooling upon heat interchange with relatively cold fluid flowing through the shell side of the heat exchanger. The high pressure hydrogen gas leaves the cold end of the heat exchanger 58 through conduit 168, is expanded in a valve 169 to a pressure of about 600 p.s.i.a. and then merged by way of conduit 170 with the cold hydrogen feed gas leaving the heat exchanger 58 through the conduit 71. A second part of the high pressure hydrogen gas in the conduit 163 is, as shown in FIGURE 1D, conducted by conduit 171 for flow through the passageway 138 of the heat exchange device 137 and then through the passageway 134 included in the vessel 132, the high pressure hydrogen gas leaves the passageway 134 at a temperature of about −314° F. and is conducted by conduit 172 to the inlet of a work expansion engine 173. The expansion engine 173 operates at a discharge pressure corresponding substantially to the intermediate pressure, that is, about 50 p.s.i.a. and the effluent of the expansion engine delivered to conduit 174 is at a temperature of about −408° F. In order to control the temperature of the high pressure hydrogen gas fed to the expansion engine, a bypass conduit 175 provided with a control 176 is connected between the conduit 163 and the conduit 172. A third part of the high pressure hydrogen stream is conducted by the conduit 163 for flow through passageway 177 of a heat exchange device 178 in countercurrent heat interchange with relatively cold fluid, described below, to further cool the high pressure hydrogen gas. The high pressure hydrogen gas is then expanded in a valve 179 to a pressure of about 600 p.s.i.a. and at a temperature of about −412° F. is conducted by conduit 180 and merged with the hydrogen feed gas in the conduit 71 upstream of the expansion valve 72.

The effluent from the expansion engine 73 in the conduit 174, the hydrogen vapor from the phase separator 77 in the conduit 78, and the hydrogen vapor from the phase separator 73 in the conduit 74 are merged in conduit 181 and the combined hydrogen vapor at a temperature of about −410° F. and a pressure of about 50 p.s.i.a. is conducted for flow through the shell side of the heat exchange device 58 and then by way of conduit 182 for flow through the shell side of the heat exchange device 47 as shown in FIGURE 1C. The intermediate pressure hydrogen gas leaves the shell side of the heat exchange device 58 at about −366° F. and is conducted from the heat exchange device 47 by conduit 183 at about −308° F. The flow of intermediate pressure hydrogen gas through the shell side of the heat exchange devices 47 and 58 cools the hydrogen feed gas flowing through the passageways 46, 51, 55, 57, 61, 65, and 69 and the high pressure hydrogen gas flowing through the passageways 165 and 167 as described above. The conduit 183 conducts the intermediate pressure hydrogen gas for flow through the shell side of the heat exchange device 158 in countercurrent heat interchange with the high pressure hydrogen gas flowing to the passageway 157 as shown in FIGURE 1B; the intermediate pressure hydrogen gas leaves the heat exchange device 158 at about ambient temperature and is passed by conduit 184 to the inlet of the compressor 152. With reference to FIGURE 1D of the drawings, hydrogen vapor withdrawn from the storage vessel 84 through conduit 200 at a pressure of about 18 p.s.i.a., hydrogen vapor discharged into the conduit 201 from the compressor 202 at about 18 p.s.i.a., and hydrogen vapor leaving the passageway 92 of the heat exchange device 81 through conduit 203 at about 18 p.s.i.a., are merged in conduit 204 and conducted thereby, at a temperature of about −420° F., for flow through the shell side of the heat exchange device 178 in countercurrent heat interchange with the high pressure hydrogen gas flowing through the passageway 177 as described above. The low pressure hydrogen gas leaves the warm end of the heat exchange device 178 at about −295° F. and is passed by conduit 205 for flow through the shell side of the heat exchange device 155 as shown in FIGURE 1B. The low pressure hydrogen gas leaves the warm end of the latter heat exchange device at about ambient temperature and is conducted by conduit 206 to the inlet of the compressor 150.

The part of the high pressure hydrogen gas from the compressor 152 which is cooled, expanded in the expansion engine 173, and then returned through the heat exchange devices 58, 47 and 158 to the suction side of the compressor 152 comprises a refrigeration medium operating in a refrigeration cycle which provides with the closed nitrogen refrigeration cycle the refrigeration requirements of the hydrogen liquefaction and conversion process. On the other hand, the parts of the high pressure hydrogen gas from the compressor 152 which are cooled and added to the hydrogen feed gas prior to the last converting device 76 comprises recycle hydrogen of high para composition. The input to the hydrogen refrigeration and recycle system comprises 90% para-hydrogen vapor withdrawn from the phase separator 73 through conduit 74, 95% para-hydrogen vapor withdrawn from the phase separator 77 through conduit 78, and low pressure 95% para-hydrogen vapor derived from the subcooler 81, the storage vessel 84 and the trailer vessel 87 and fed by the conduit 204 to the shell side of the heat exchange device 178. Thus, the high pressure hydrogen gas from the compressor 152 has a para composition of at least 90%. Upon starting up the conduits 170 and 180 returning cooled 90% or higher para-hydrogen to the hydrogen feed may be closed by valves not shown so as to accumulate the required mass of hydrogen for the refrigeration cycle and thereafter such valves may be gradually opened until equilibrium conditions are reached, that is, when the combined mass of the hydrogen vapor in conduits 74, 78 and 204 substantially corresponds to the combined mass of high para-hydrogen recycled to the hydrogen feed through conduits 170 and 180. Preferably, the mass of the high para composition hydrogen added to the hydrogen feed through the conduit 170 corresponds substantially to the mass of the hydrogen vapor from phase separators 73 and 77 with which it is in countercurrent heat interchange. Likewise, it is preferable that the mass of the high pressure hydrogen flowing through the heat exchange device 178 is correlated with the mass of the hydrogen vapor in conduit 204. The mass of the hydrogen vapor from the phase separators 73 and 77 will remain substantially constant during normal operation of the process; however, the mass of the hydrogen vapor in the conduit 204 will vary depending upon the handling of the converted liquid hydrogen product. Accordingly, means may be provided to control the flow of high pressure hydrogen to the heat exchange device 178 and a hydrogen gas holder may be provided. The feature of flowing hydrogen of high para composition through cooling paths without conversion and separate from the hydrogen feed gas undergoing conversion and of adding such hydrogen of high para composition to the hydrogen feed gas upstream of the final converting device makes it possible to recover vaporized or unliquefied high para-hydrogen in an efficient manner which aids in the control of the overall cycle, reduces capital investment, and provides for more efficient ortho-hydrogen to para-hydrogen conversion. Moreover, the feature of incorporating a hydrogen refrigeration cycle and a high para composition hydrogen recycle in the same system makes it possible to further reduce capital investment and improves the over-all efficiency of the process.

The nitrogen refrigeration cycle described above incorporates a novel liquefaction cycle which, in its simplest form, as shown in FIGURE 1A, includes the compressor 104, the heat exchanger 110, expansion valve 122, vessel 123, heat exchanger 114, and expansion engine 125. It is known that the efficiency of a low temperature process is measured in part by the irreversibility of the process and one of the major power losses due to irreversibility occurs in the heat exchanger. The novel liquefaction cycle increases the efficiency of the heat exchanger by improving the parallelism between the cooling curves and by maintaining close temperature differences between the cooling curves at their warm and cold ends. This is accomplished by the combination of the withdrawing of a portion of the high pressure gas from the passageway 109 through the conduit 127 to the expansion engine 125 and of bypassing a portion of the high pressure gas through the heat exchange device 114 to the expansion engine. The side stream withdrawn from the passageway 109 is of such a mass as to establish a close temperature difference at the cold ends of the cooling curves and is at a temperature such that the effluent of the expansion engine is above saturation temperature at the existing pressure to prevent formation of liquid within the expander. The mass of the high pressure gas bypassed through the heat exchange device 114 on to the expander is such as to establish a close temperature difference between the cooling curves at the warm end of the heat exchange device 110. The diverted high pressure gas is cooled in the heat exchange device 114 by the use of auxiliary refrigeration to the optimum temperature for expansion in the engine 125. The feature of bypassing a portion of the high pressure gas around the heat exchange device 110 to the expansion engine decreases the mass of high pressure gas passing through the expansion valve 122 for liquefaction; however, since the heat exchange device 110 operates in a less irreversible manner, the cycle produces liquid with lower power requirements than prior liquefaction cycles including cascade systems. The novel liquefaction cycle may include one or two stages of valve expansion. The high pressure gas may be expanded to atmospheric pressure by valve 122 or to a superatmospheric pressure with the liquid thereafter being further reduced in pressure such as by the valve 131 shown in FIGURE 1D. In the latter case, the liquefier would include a low pressure heat exchange device such as the heat exchange device 117. The cooling curves of the latter heat exchange device are influenced by flow through the passageway 119 and it is to be understood that in a liquefier including a low pressure heat exchanger device a side stream could be withdrawn from the high pressure gas passageway and a portion of the high pressure gas bypassed through a separate cooler to the expansion engine to decrease irreversibility losses in a manner similar to the heat exchange device 110. Furthermore, as disclosed herein, the cycle is capable of providing refrigeration at a number of different temperature levels; the feature of passing high pressure gas through the auxiliary cooler to the expansion engine provides flexibility in that environment.

The hydrogen product flowing through the passageway 92 of the heat exchange device 81 to effect subcooling of the liquid hydrogen product of 95% para composition is reduced by the valve 93 to a pressure slightly above atmospheric pressure to insure flow of the vapor on to the inlet of the compressor 150. Likewise, the vapor withdrawn from the storage vessel 84 through conduit 200 is of a pressure slightly greater than atmospheric pressure. In order to transfer liquid product at minimum loss to the trailer vessel 87, it is desirable that the transfer occur under atmospheric pressure. In order to recover the resulting vapors from such transfer, a compressor 202 which operates at the existing low temperature, namely, in the region of −420° F., is provided in the vapor line 201 from the trailer vessel 87 to increase the pressure of such vapor from atmospheric to a slightly higher pressure as existing in the conduits 95 and 200.

In the foregoing description, pressure drop due to resistance to flow through conduits, heat exchange devices and other equipment have been disregarded.

When practicing the present invention with a source of hydrogen feed gas of high purity, such as hydrogen gas free of methane or other impurity having a low boiling point, it would be possible to operate the process without the heat exchange device 17 and the phase separators 19 and 29 and to employ liquid nitrogen in the vessel 26 under a lower pressure. In the foregoing example, the pressure of the vessel 26 is selected so as not to cool the hydrogen feed gas to the freezing temperature of methane under the existing pressure.

Although one embodiment of the several inventions has been disclosed and described herein, it is to be expressly understood that various changes and substitutions may be made therein without departing from the spirit of the invention as well understood by those skilled in the art. Reference therefore will be had to the appended claims for a definition of the limits of the invention.

What is claimed is:

1. Process for producing liquid hydrogen of high para composition which comprises:

passing compressed hydrogen feed in countercurrent heat interchange with relatively cold fluid and catalytically converting ortho-hydrogen to para-hydrogen to provide high para composition hydrogen feed at a relatively low temperature, expanding high para composition hydrogen feed to a lower pressure effect partial liquefaction of the high para composition hydrogen feed, separating high para composition liquid hydrogen from high para composition unliquefied hydrogen, catalytically treating high para composition liquid hydrogen to increase further the para composition of the liquefied hydrogen, warming high para composition unliquefied hydrogen and compressing warm high para composition hydrogen to a relatively high pressure, passing compressed high para composition unliquefied hydrogen in countercurrent heat interchange with relatively cold fluid to cool compressed high para composition unliquefied hydrogen to a low temperature without catalytic conversion of ortho-hydrogen, expanding cool high para composition unliquefied hydrogen, and catalytically treating expanded high para composition hydrogen to increase further its para composition.

2. Process for producing liquid hydrogen of high para composition which comprises:

passing compressed hydrogen feed in countercurrent heat interchange with relatively cold fluid and catalytically converting ortho-hydrogen to para-hydrogen to provide high para composition hydrogen feed at a relatively low temperature, expanding cool high para composition hydrogen feed to a relatively low pressure to effect partial liquefaction of the high para composition hydrogen feed, separating high para composition liquid hydrogen from high para composition unliquefied hydrogen, passing high para composition liquid hydrogen to a catalytic treating zone to increase further the para composition of the liquid hydrogen, warming high para composition unliquefied hydrogen and compressing warm high para composition unliquefied hydrogen to a relatively high pressure, passing compressed high para composition unliquefied hydrogen in countercurrent heat interchange with relatively cold fluid to cool compressed high para composition unliquefied hydrogen to a low temperature without catalytic conversion of ortho-hydrogen, and adding cool high para composition unliquefied hydrogen to the cool high para composition hydrogen feed before the expansion step.

3. Process for producing liquid hydrogen of high para composition as defined in claim 2 in which the high para composition unliquefied hydrogen includes high para composition liquid hydrogen vaporized by the heat of catalytic conversion of ortho-hydrogen to para-hydrogen.

4. Process for producing liquid hydrogen of high para composition as defined in claim 2 in which high para composition unliquefied hydrogen is compressed to a high pressure relative to the pressure of the hydrogen feed prior to expansion.

5. Process for producing liquid hydrogen of high para composition as defined in claim 2 in which converted liquid hydrogen is fed to a storage vessel and vapor from the storage vessel is warmed and compressed to provide a part of the compressed high para composition unliquefied hydrogen.

6. Process for producing liquid hydrogen of high para composition as defined in claim 2 in which a part of the compressed high para composition unliquefied hydrogen is expanded with production of external work and the effluent of the expansion step is passed in countercurrent heat interchange with the hydrogen feed.

7. Process for producing liquid hydrogen of high para composition as defined in claim 6 in which high para composition unliquefied hydrogen is merged with the effluent of the expansion step.

8. Process for producing liquid hydrogen of high para composition which comprises:
cooling compressed hydrogen feed and catalytically converting ortho-hydrogen to para-hydrogen to provide high para composition hydrogen feed at a relatively low temperature,
expanding high para composition hydrogen feed to a lower temperature to effect partial liquefaction of the high para composition hydrogen feed,
separating high para composition liquid hydrogen from high para composition unliquefied hydrogen,
catalytically treating separated liquid hydrogen to increase further its para composition,
providing compressed high para composition hydrogen gas under a relatively high pressure,
dividing compressed high para composition hydrogen gas into a least a first part and a second part and cooling the first part and the second part,
adding the first part to high para composition hydrogen feed before the expansion step,
expanding the second part with production of external work,
passing effluent of the work expansion step and high para composition unliquefied hydrogen in countercurrent heat interchange with compressed hydrogen feed, and
thereafter using effluent of the work expansion step and high para composition unliquefied hydrogen to provide the compressed high para composition hydrogen gas.

9. Process for producing liquid hydrogen of high para composition as defined in claim 8 in which hydrogen vapor resulting from the catalytic treatment of expanded liquid hydrogen is passed in heat interchange with compressed hydrogen feed and thereafter used to provide the compressed high para composition hydrogen gas.

10. Process for producing liquid hydrogen of high para composition as defined in claim 9 in which effluent of the work expansion step, high para composition unliquefied hydrogen and hydrogen vapor resulting from catalytic treatment of expanded liquid hydrogen are flowed through a common passageway in countercurrent heat interchange with compressed hydrogen feed.

11. Process for producing liquid hydrogen of high para composition as defined in claim 10 in which the first part of compressed high para composition hydrogen gas is passed in countercurrent heat interchange with the common passageway and in which the second part of compressed high para composition hydrogen gas is passed in heat interchange with a relatively cold fluid prior to the work expansion step, the relatively cold fluid being provided by a closed refrigeration cycle.

12. Process for producing liquid hydrogen of high para composition as defined in claim 11 in which the closed refrigeration cycle provides refrigeration for cooling the compressed hydrogen feed.

13. Process for producing liquid hydrogen of high para composition which comprises:
cooling compressed hydrogen feed and catalytically converting ortho-hydrogen to para-hydrogen to provide high para composition hydrogen feed at a relatively low temperature,
expanding high para composition hydrogen feed to a lower pressure to effect partial liquefaction of the high para composition hydrogen feed,
separating high para composition liquid hydrogen from high para composition unliquefied hydrogen,
catalytically treating separated liquid hydrogen to increase further its para composition,
passing liquid hydrogen of increased para composition to a storage vessel,
providing compressed high para composition hydrogen gas under a relatively high pressure,
dividing compressed high para composition hydrogen gas into a first part, a second part and a third part and cooling the first part, the second part and the third part,
adding the first part to high para composition hydrogen feed before the expansion step,
expanding the second part with production of external work,
passing effluent of the work expansion step and high para composition unliquefied hydrogen in countercurrent heat interchange with compressed hydrogen feed,
passing the third part in countercurrent heat interchange with relatively cold high para composition hydrogen vapor derived at least in part from the storage vessel and thereafter adding the third part to high para composition hydrogen feed before the expansion step, and
utilizing high para composition hydrogen vapor following the last-named heat interchange to provide at least a part of the compressed high para composition hydrogen gas.

14. Process for producing liquid hydrogen of high para composition which comprises:
passing compressed hydrogen feed in countercurrent heat interchange with relatively cold fluid and catalytically converting ortho-hydrogen to para-hydrogen to provide high para composition hydrogen feed at a relatively low temperature,
expanding cool high para composition hydrogen feed to a relatively low pressure to effect partial liquefaction of the high para composition hydrogen feed,
separating high para composition liquid hydrogen from high para composition unliquefied hydrogen,
passing high para composition liquid hydrogen to a catalytic treating zone to increase further the para composition of the liquid hydrogen,
providing compressed high para composition hydrogen gas under relatively high pressure, a closed refrigeration cycle producing a first source of cold liquid under high pressure and a second source of colder liquid under relatively low pressure, passing compressed high para composition hydrogen gas in heat interchange with liquid of the second source to cool the compressed high para compositon hydrogen gas, expanding with production of external work the cool compressed high para composition hydrogen gas, passing the effluent of the work expansion step and high para composition unliquefied hydrogen in countercurrent heat interchange with the compressed hydrogen fed and thereafter utilizing the effluent of the work expansion step and high para composition unliquefied hydrogen to provide the compressed high para composition gas, and passing compressed hydrogen feed in heat interchange with the liquid of the first source prior to countercurrent heat interchange with effluent of the work expansion step and high para composition unliquefied hydrogen.

15. Process for producing liquid hydrogen of high para composition as defined in claim 2 in which:

compressed hydrogen feed is passed through a series of passageways of a heat exchange zone in countercurrent heat interchange with relatively cold fluid, the compressed hydrogen feed leaving the cold ends of the passageways at progressively decreasing temperature levels, and passing compressed hydrogen from the cold ends of the passageways through a converter and then to the warm end of the next passageway of the series for flow therethrough.

16. Process for producing liquid hydrogen of high para composition which comprises:

cooling compressed hydrogen feed of relatively low para composition to a first temperature below ambient temperature, passing relatively cold gas through a heat exchange zone in a direction from the cold end to the warm end of the zone, the relatively cold fluid entering the cold end of the zone at a second temperature and leaving the warm end of the zone at a third temperature greater than the second temperature and less than the first temperature, passing cooled hydrogen feed at the first temperature to the heat exchange zone and flowing the hydrogen feed through a first passageway of the heat exchange zone in countercurrent heat exchange with said relatively cold gas to cool the hydrogen feed to a fourth temperature less than the third temperature and greater than the second temperature, withdrawing the hydrogen feed at the fourth temperature from the first passageway of the heat exchange zone and catalytically treating the hydrogen feed at said fourth temperature in a first catalytic conversion zone to effect conversion of ortho-hydrogen to para-hydrogen while warming the hydrogen feed, returning the catalytically treated hydrogen feed from the first catalytic conversion zone to the heat exchange zone at a temperature of the heat exchange zone greater than the fourth temperature and passing the hydrogen feed through a second passageway of the heat exchange zone in countercurrent heat interchange with said cold gas to cool the hydrogen feed to a fifth temperature less than the fourth temperature and greater than the second temperature, withdrawing the hydrogen feed at the fifth temperature from the second passageway and catalytically treating the hydrogen feed at said fifth temperature in a second catalytic conversion zone to effect further conversion of ortho-hydrogen to para-hydrogen while warming the hydrogen feed, returning the further catalytically treated hydrogen feed from the second catalytic conversion zone to the heat exchange zone at a temperature of the heat exchange zone greater than the fifth temperature and flowing the hydrogen feed through a third passageway of the heat exchange zone in countercurrent heat interchange with said cold gas to cool the hydrogen feed to a sixth temperature less than the fifth temperature and greater than the second temperature, and thereafter further cooling the hydrogen feed to effect at least its partial liquefaction.

References Cited
UNITED STATES PATENTS

| | | | |
|---|---|---|---|
| 3,092,461 | 6/1963 | Vander Arend et al. | 23—210 |
| 3,095,274 | 6/1963 | Crawford | 23—210 |
| 3,116,115 | 12/1963 | Kasparian et al. | 23—212 X |
| 3,180,709 | 4/1965 | Yendall et al. | 23—210 |

MILTON WEISSMAN, *Primary Examiner.*

OSCAR R. VERTIZ, EDWARD STERN, *Examiners.*